United States Patent
Polepalli Yeshwanth et al.

(10) Patent No.: US 11,153,316 B2
(45) Date of Patent: Oct. 19, 2021

(54) LOCKED-DOWN CLUSTER

(71) Applicant: International Business Machines Corporation, Armonk, NY (US)

(72) Inventors: Preethi Polepalli Yeshwanth, Alpharetta, GA (US); Angel Nunez Mencias, Stuttgart (DE); James Robert Magowan, Woking (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 152 days.

(21) Appl. No.: 16/556,672

(22) Filed: Aug. 30, 2019

(65) Prior Publication Data

US 2021/0067512 A1     Mar. 4, 2021

(51) Int. Cl.
*H04L 29/06* (2006.01)
*G06F 21/45* (2013.01)

(52) U.S. Cl.
CPC .............. *H04L 63/10* (2013.01); *G06F 21/45* (2013.01); *H04L 63/20* (2013.01); *H04L 63/145* (2013.01)

(58) Field of Classification Search
CPC ....... H04L 63/10; H04L 63/20; H04L 63/145; G06F 21/45
USPC ........................................................... 726/1
See application file for complete search history.

(56) References Cited

U.S. PATENT DOCUMENTS

| | | | |
|---|---|---|---|
| 10,326,802 B1 | 6/2019 | Irwan et al. | |
| 2007/0143291 A1* | 6/2007 | Browne | G06F 21/604 |
| 2007/0245348 A1* | 10/2007 | Araujo, Jr. | G06F 21/53 |
| | | | 718/1 |
| 2011/0106802 A1* | 5/2011 | Pinkney | G06F 16/122 |
| | | | 707/737 |
| 2013/0031542 A1* | 1/2013 | Arcilla | G06F 8/60 |
| | | | 717/177 |
| 2013/0173909 A1* | 7/2013 | Arno | H04L 63/0428 |
| | | | 713/153 |
| 2015/0079965 A1* | 3/2015 | Mullins | H04W 12/37 |
| | | | 455/419 |
| 2018/0083977 A1 | 3/2018 | Murugesan et al. | |
| 2019/0102155 A1* | 4/2019 | Garvey | G06F 8/60 |
| 2019/0260718 A1* | 8/2019 | Buendgen | G06F 9/45558 |
| 2020/0233689 A1* | 7/2020 | Neginhal | G06F 3/062 |

(Continued)

OTHER PUBLICATIONS

Chou,. "Security threats on cloud computing vulnerabilities." International Journal of Computer Science & Information Technology 5.3 (2013) 10p.

(Continued)

*Primary Examiner* — Kambiz Zand
*Assistant Examiner* — Aubrey H Wyszynski
(74) *Attorney, Agent, or Firm* — Cantor Colburn LLP; L. Jeffrey Kelly

(57) ABSTRACT

Aspects of the invention include a computer-implemented method including providing, by a processor, a computing cluster having a plurality of cluster nodes and services. The method provides, by the processor, a limited catalog of services and restricts, by the processor, access of an administrator of the computing cluster to use of a service deployer, wherein the service deployer restricts administrator access to installation and administration of clusters and deployment of only the limited catalog of services.

15 Claims, 6 Drawing Sheets

(56) References Cited

U.S. PATENT DOCUMENTS

2020/0327252 A1* 10/2020 McFall ................. G06F 21/602

OTHER PUBLICATIONS

Foley, Object Name System Privacy and Security. Diss. Massachusetts Institute of Technology, 2005. 53p.
Sayfan, Mastering Kubernetes. Automating container deployment and management Packt Publishing Ltd, 2017. 426p.

* cited by examiner

300

LOCKED-DOWN CLUSTER

BACKGROUND

The present invention generally relates to clusters, and more specifically, to locked-down clusters.

SUMMARY

Embodiments of the present invention are directed to locked-down clusters. A non-limiting example computer-implemented method includes providing, by a processor, a computing cluster having a plurality of cluster nodes and services. The method provides, by the processor, a limited catalog of services and restricts, by the processor, access of an administrator of the computing cluster to use of a service deployer, wherein the service deployer restricts administrator access to installation and administration of clusters and deployment of only the limited catalog of services.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
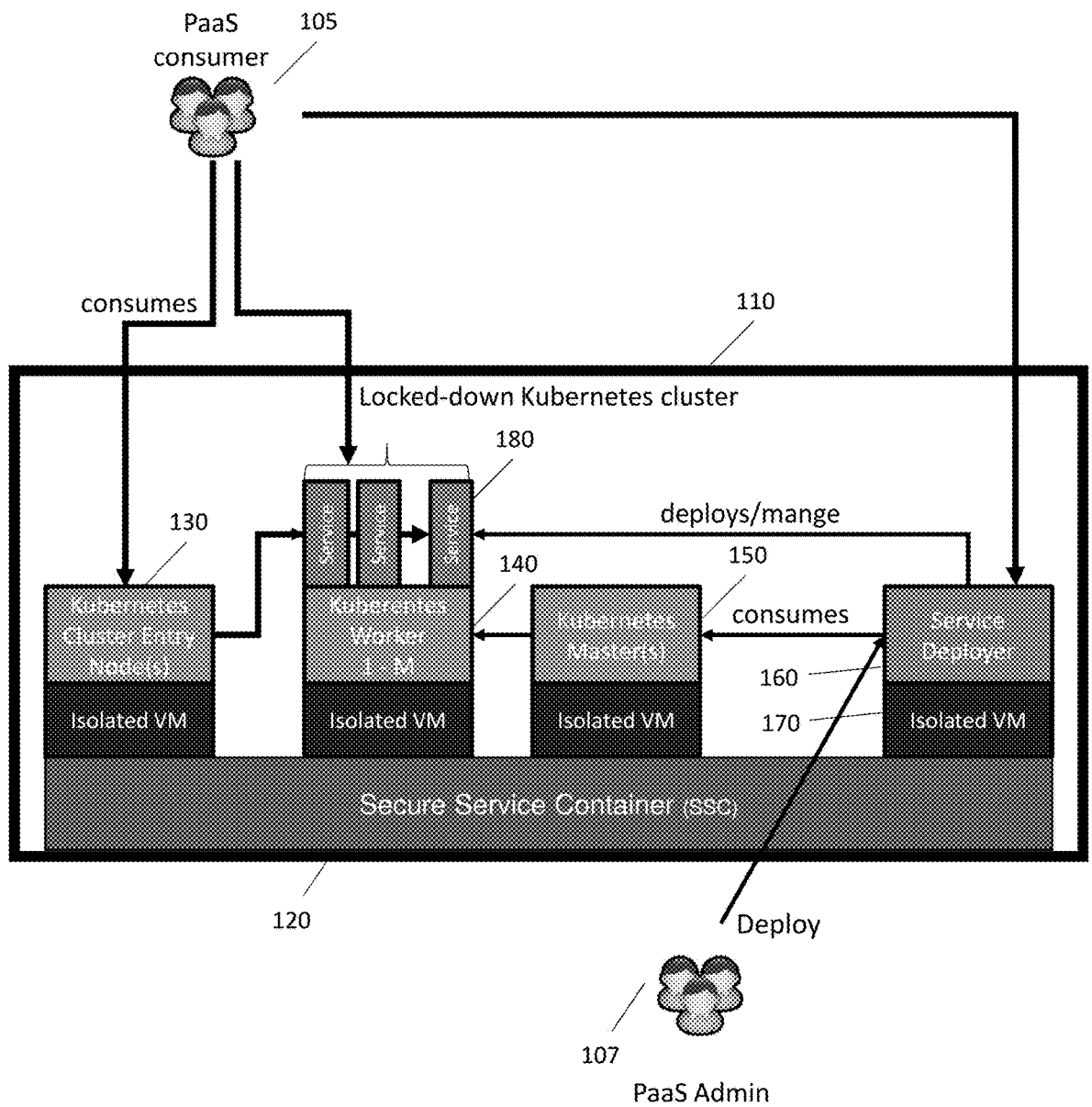
FIG. 1 illustrates a locked down cluster in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a locked cluster where only restrictive access is given to all administrators. Any application deployment on such a locked-cluster namespace is only possible through pre-defined service catalog and service brokers installed and registered on the cluster. Embodiments protect from insider cluster administrator attacks for on-premise offerings; control access to any administrator from accessing cluster-wide security policies, manage secrets and encryption in an automatic fashion without any human intervention, and deployment happens using open service broker API's.

Kubernetes is an open-source orchestration system for deploying, managing and scaling containers. Modern applications are increasingly built using containers—microservices packaged with their dependencies and configurations. Kubernetes, or k8s for short, is open-source software for deploying and managing those containers at scale. With Kubernetes, one can build, deliver, and scale containerized apps faster. Kubernetes and orchestration systems often use the term "Paas" which stands for platform as a service. Paas is a category of cloud computing services that provides a platform allowing customers to develop, run, and manage applications without the complexity of building and maintaining the infrastructure typically associated with developing and launching an app.

Kubernetes provide portability. Kubernetes can move containerized workloads from local development machines to production—seamlessly. It can orchestrate containers consistently in different environments across on-premises infrastructure and public and hybrid clouds. Kubernetes provide scalability. It defines complex containerized applications and deploys them globally across a cluster of servers—or even multiple clusters—as Kubernetes optimizes resources according to a desired state. With built-in autoscaler, Kubernetes can easily scale applications horizontally while automatically monitoring and maintaining container health.

Kubernetes provide extensibility. One can access a wide and ever-growing collection of extensions and plugins created by the developers and companies that form the Kubernetes community. A conformant Kubernetes service allows one to take full advantage of these community offerings and add capabilities such as security, monitoring, management.

While the discussion herein refers to Kubernetes, embodiments of the present invention apply to all cluster orchestrators and not just Kubernetes. The use of Kubernetes is for demonstrative purposes.

Administrators on cluster orchestrators like Kubernetes have cluster-wide access to all the resources of clusters such as namespaces, docker containers, security policies and so on. In a specific namespace the user could again be assigned with roles such as cluster administrator, administrator, operator, editor, or viewer, for example.

A secure solution such as banking applications or blockchain would generally be deployed on a specific namespace environment. However, the administrator with cluster-wide access, and also the namespace administrator, on the cluster can always misuse the privileges on the application namespace.

A Kubernetes cluster administrator has complete access to all the namespaces on the cluster which enables him to access deployments and their data. This leaves a probably insider threat, where cluster administrator could install malicious software on any namespace of Kubernetes cluster which could make the system vulnerable to security attacks. Furthermore, in the prior art data, privacy protection and separation of duties are not enforced for the cluster administrator.

One or more embodiments of the present invention address one or more of the above-described shortcomings of the prior art by providing a locked cluster where only restrictive access is given to all administrators. Any application deployment on such a locked-cluster namespace should only be possible through pre-defined service catalog and service brokers installed and registered on the cluster.

One or more embodiments of the present invention provide technological improvements over current methods of enabling administrators that require administrators to have cluster-wide access and cluster-wide credential available for use. Disadvantages of contemporary approaches may include that cluster-wide credentials can be used to access all namespaces and deployments across namespaces. PaaS administrators also act as a super administrator who have access to all the managed services for cluster administration One or more embodiments of the present invention provide technical solutions to one or more of these disadvantages of existing solutions by limiting cluster-wide access of administrators by providing a locked-down cluster.

Turning now to FIG. 1, a locked-down cluster is generally shown in accordance with one or more embodiments of the present invention. A locked-down Kubernetes cluster 110 is deployed on secure platforms such as a Secure Service Container (SSC) 120 and restricts a hardware administrator and operating system administrator 107 from logging into the cluster nodes 130, as well as Kubernetes worker 140, master 150, and proxy nodes (not shown). Installation and administration are accomplished by a secure service deployer module 160 which runs as a container component on the SSC 120 that would also be protected from all administrators gaining console/system access. The service deployer module 160 runs on an isolated virtual machine 170. The service deployer module 160 is setup and triggered to install Kubernetes clusters by an administrator (a human user) using existing SSC APIs.

The operations of service deployer module 160 is to setup Kubernetes clusters in an automated fashion based on user specified configuration. Secure servicer deployer module 160 is designed to enforce strict security policies on the locked-down cluster and also create user 105 roles such as Cluster Viewer who has cluster-wide view only access and may expose such user credentials to the administrator triggering the installation. Secure service deployer module 160, having setup the Kubernetes cluster, also maintains cluster-admin 107 credentials that are abstracted from any human user. Service deployer module 160 exposes a limited set of Representational State Transfer ("REST") APIs that allow the users 105 to view the cluster wide resources and to perform basic administrative operations such as creating namespaces and adding users to the namespace, for example.

Alongside restricting any human user having cluster-wide administrative privileges, a service catalog 180 is installed on the cluster 110 with a pre-defined set of services. Service catalogs 180 use the Open service broker API to communicate with service brokers, acting as an intermediary for the Kubernetes API Server to negotiate the initial provisioning and retrieve the credentials necessary for the application to use a managed service. Services from the catalog can be installed and accessed through service broker API's to create application instances. This also prevents malicious software being installed by an insider attacker such as cluster administrator or a namespace administrator.

Figure 2:
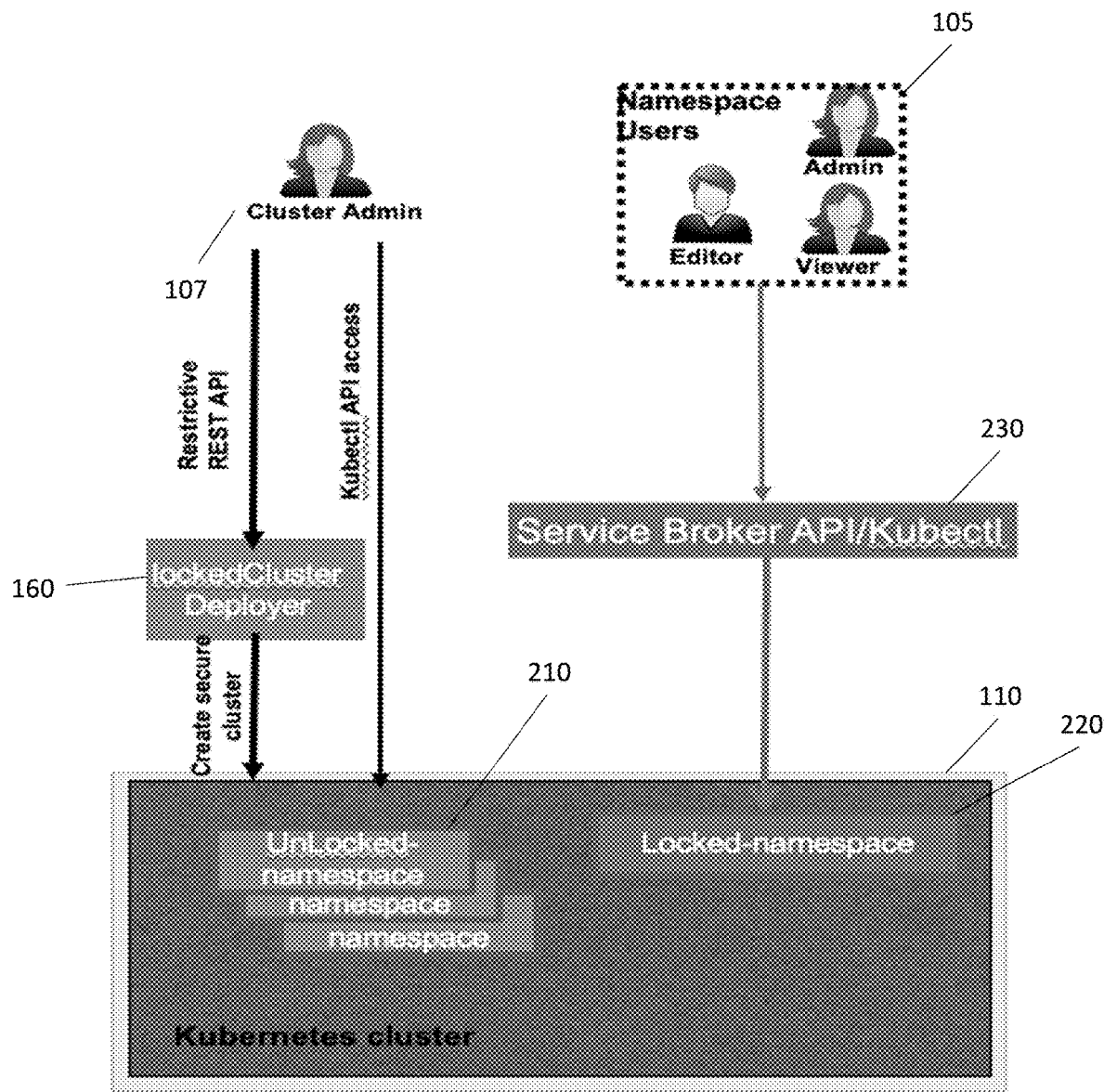
FIG. 2 illustrates the operation of a locked-down cluster architecture in accordance with one or more embodiments of the present invention.

FIG. 2 illustrates the operation of a locked-down cluster architecture in accordance with one or more embodiments of the present invention. The locked-down Kubernetes cluster 110 is running on a secure platform such as Secure Service Container 120 (shown in FIG. 1). Cluster-administrator 107 privileges are not exposed to any human user. Secure service deployer module 160 is provided secure APIs to deploy only catalogs. Namespace users can create instances of applications in a locked-namespace 220 using service broker API 230. Cluster administrator 107 through restrictive REST API can access the secure service deployer module 160 which can create secure clusters.

Embodiments of the invention can also be used with Istio. Istio is an open source independent service mesh that provides the fundamentals to successfully run a distributed microservice architecture. As organizations increasingly adopt cloud platforms, developers have to architect for portability using microservices, while operators have to manage large distributed deployments that span hybrid and multi-cloud deployments. Istio reduces the complexity of managing microservice deployments by providing a uniform way to secure, connect, and monitor microservices. Istio provides complimentary capabilities to an embodiment of the invention, embodiments can control what can be deployed to a namespace and the resulting namespace admin access, Istio can complement this by building a service mesh amongst containers deployed to a namespace.

Figure 3:
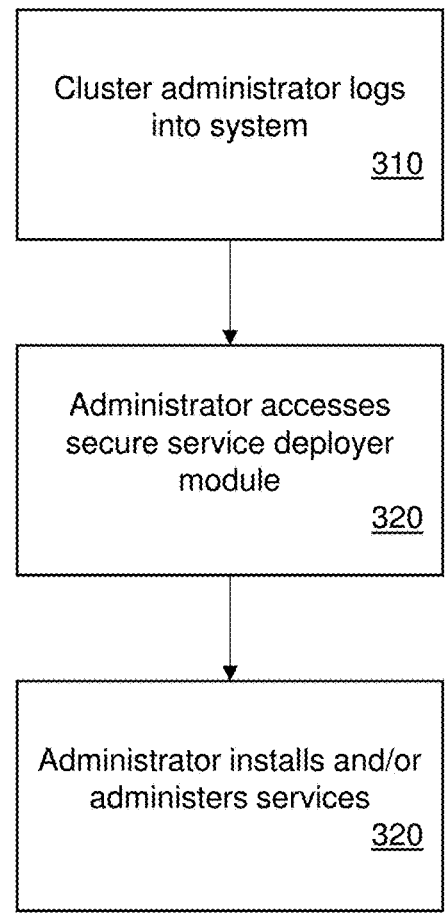
FIG. 3 illustrates a flow diagram of a process for a locked-down cluster in accordance with one or more embodiments of the present invention.

FIG. 3 illustrates a flow diagram 300 of a process for a locked-down cluster in accordance with one or more embodiments of the present invention. In operation, a cluster administrator, via a processor, logs into the system (block 310). The administrator accesses, by the processor, a secure service deployer module 160 (block 320) which restricts the administrator from logging into the cluster nodes 130, as well as Kubernetes worker 140, master 150, and proxy nodes (not shown). Through API's on the secure services deployer module 160, the cluster administrator, by the processor, installs and/or administers services in a limited catalog of services (block 330).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
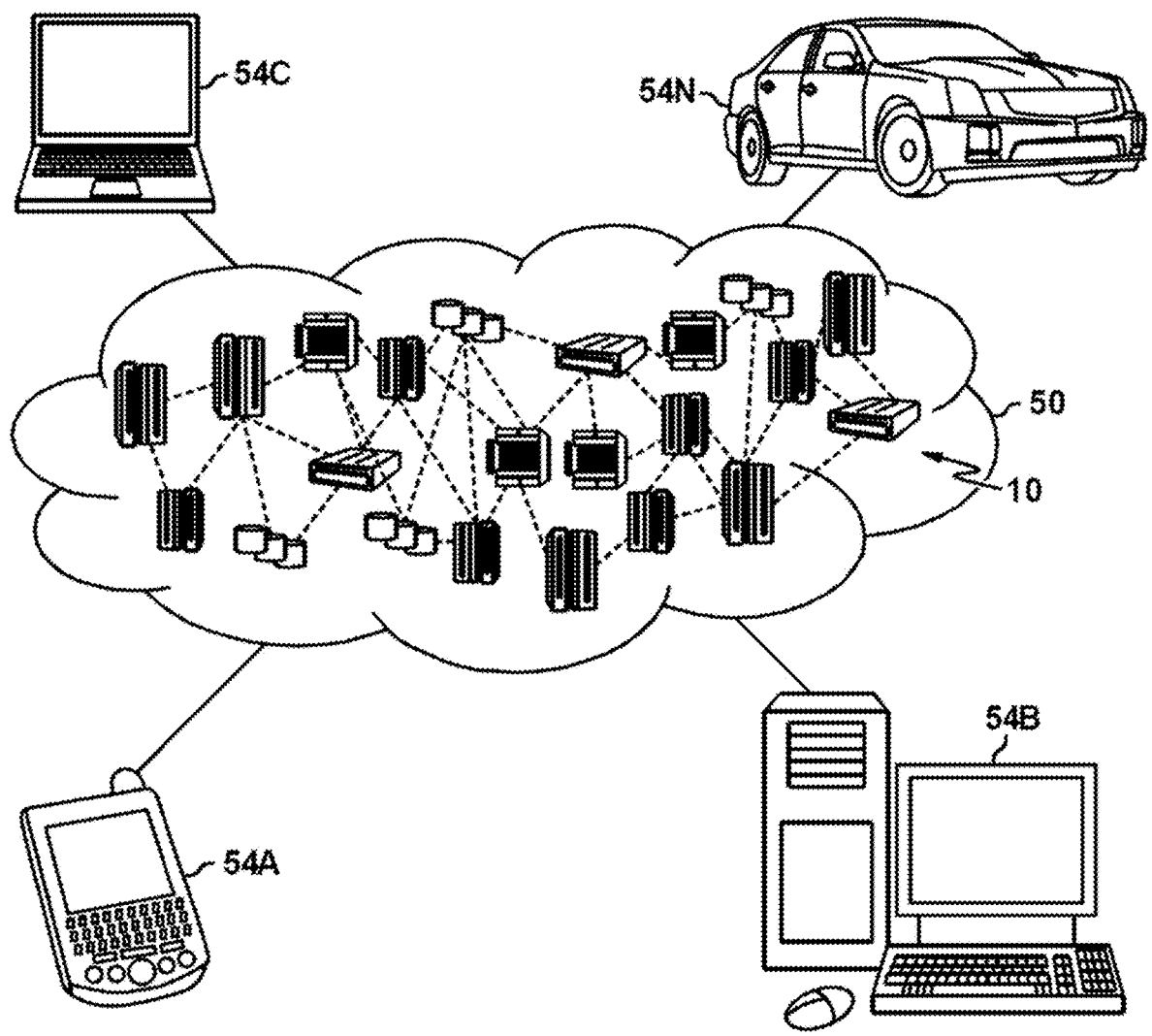
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
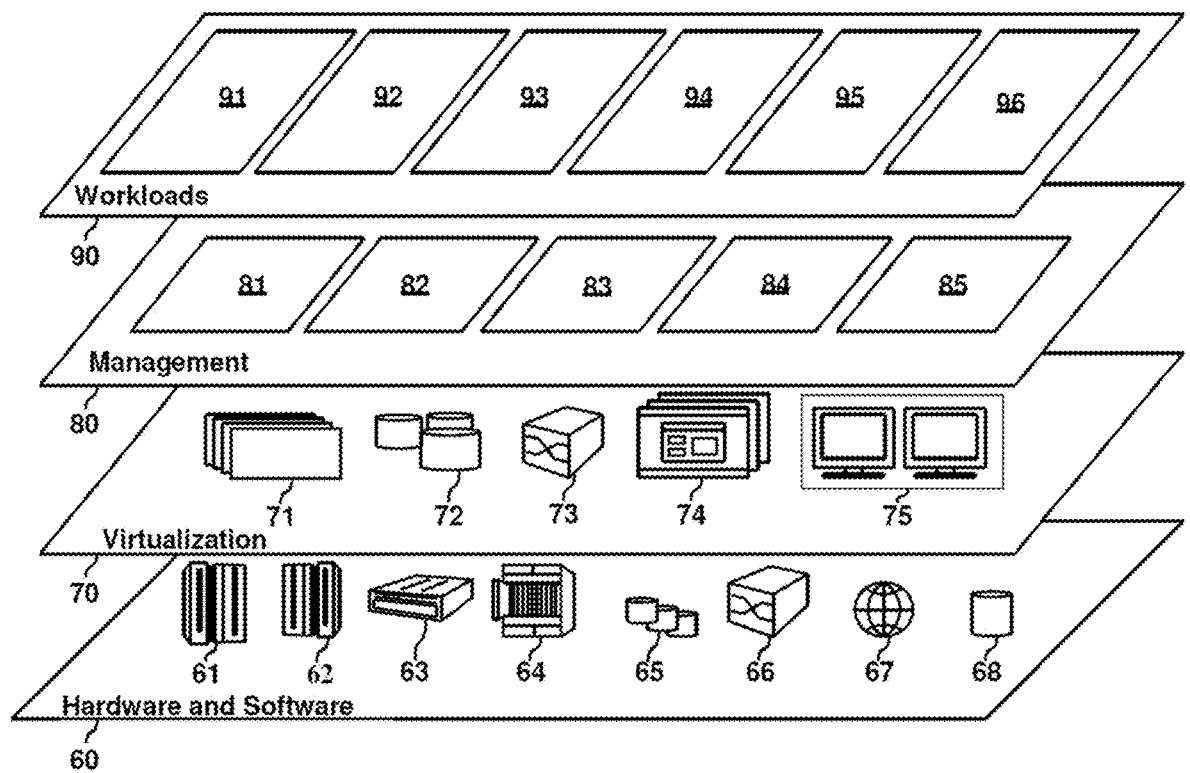
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Secure service container-based virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Kubernetes cluster processing 96

Figure 6:
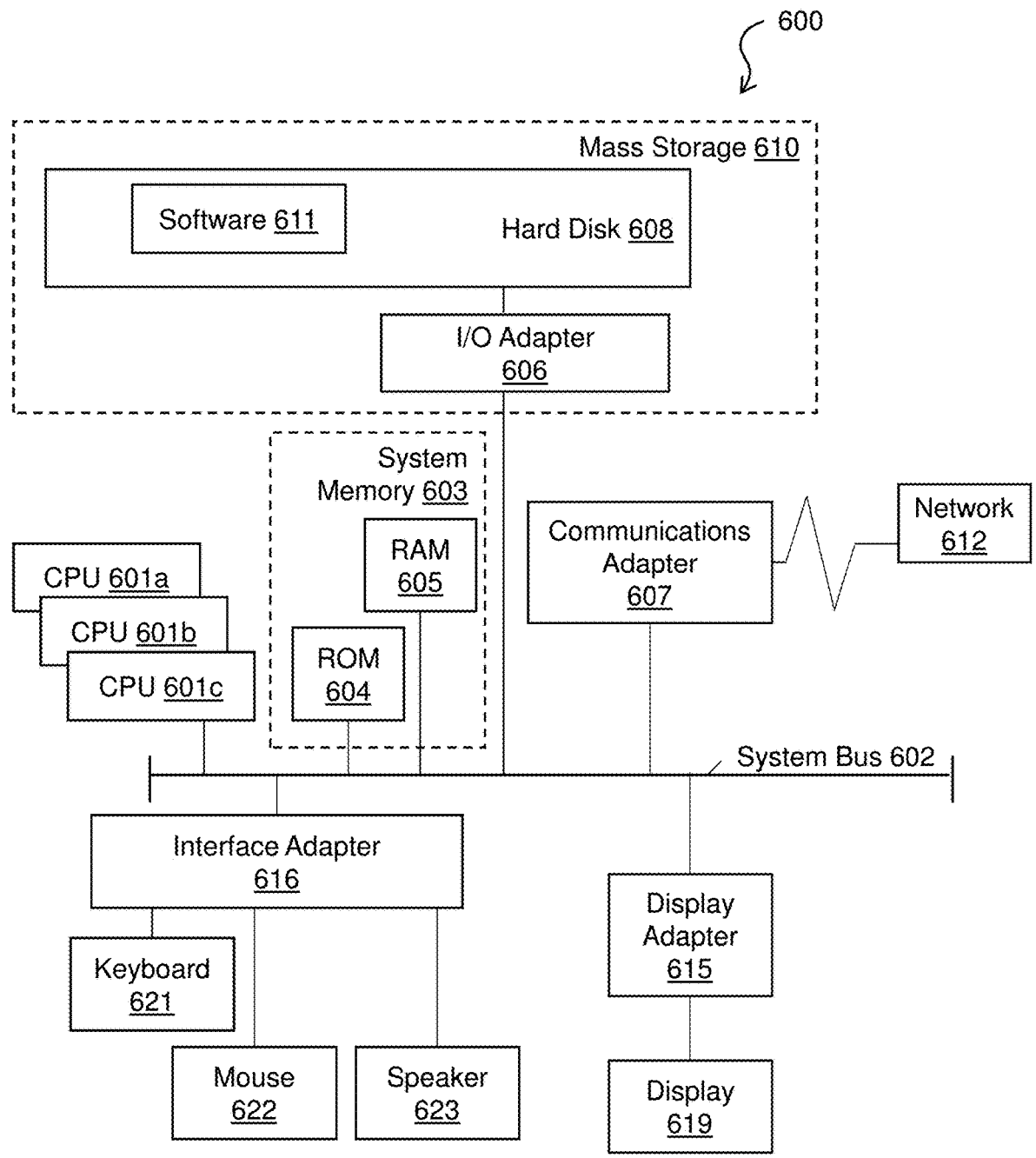
FIG. 6 depicts a computer system in accordance with one or more embodiments of the present invention.

Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the Internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   providing, by a processor, a computing cluster having a plurality of cluster nodes and services, wherein the computing cluster is deployed on a secure service container;
   providing, by the processor, a limited catalog of services;
   restricting, by the processor, access of an administrator of the computing cluster to use of a service deployer which runs as a container component on the secure service container, wherein the service deployer restricts administrator access to installation and administration of only the limited catalog of services and prevents the administrator from logging into nodes on the secure service container other than the service deployer;
   exposing, by the processor, a limited set of REST API's that allow a user to view cluster-wide resources and to perform basic administrative functions including creating namespaces and adding users to a namespace, wherein the user is not an administrator.

2. The computer-implemented method of claim 1, comprising setting-up clusters, by the processor, in an automated fashion based on user specified configurations.

3. The computer-implemented method of claim 1, comprising enforcing strict security policies, by the processor, on the cluster to prevent administrator cluster-wide access to the cluster.

4. The computer-implemented method of claim 1, comprising creating, by the processor, user roles and exposing the user roles to the administrator.

5. The computer-implemented method of claim 1, comprising maintaining, by the processor, cluster administrator credentials that are abstracted from a user.

6. A system comprising:
a memory having computer readable instructions; and
one or more processors for executing the computer readable instructions, the computer readable instructions controlling the one or more processors to perform operations comprising:
providing, by the processor, a computing cluster having a plurality of cluster nodes and services, wherein the computing cluster is deployed on a secure service container;
providing, by the processor, a limited catalog of services;
restricting, by the processor, access of an administrator of the computing cluster to use of a service deployer, wherein the service deployer restricts administrator access to installation and administration of only the limited catalog of services and prevents the administrator from logging into nodes on the secure service container other than the service deployer;
exposing, by the processor, a limited set of REST API's that allow a user to view cluster-wide resources and to perform basic administrative functions including creating namespaces and adding users to a namespace, wherein the user is not an administrator.

7. The system of claim 6, wherein the service deployer sets up clusters in an automated fashion based on user specified configurations.

8. The system of claim 6, wherein the service deployer enforces strict security policies on the cluster to prevent administrator cluster-wide access to the cluster.

9. The system of claim 6, wherein the service deployer creates user roles and exposes the user roles to the administrator.

10. The system of claim 6, wherein the secure deployer maintains cluster administrator credential that are abstracted from a user.

11. A computer program product comprising a computer readable storage medium having program instructions embodied therewith, the program instructions executable by a processor to cause the processor to perform operations comprising:
providing, by the processor, a computing cluster having a plurality of cluster nodes and services, wherein the computing cluster is deployed on a secure service container;
providing, by the processor, a limited catalog of services;
restricting, by the processor, access of an administrator of the computing cluster to use of a service deployer, wherein the service deployer restricts administrator access to installation and administration of only the limited catalog of services and prevents the administrator from logging into nodes on the secure service container other than the service deployer;
exposing, by the processor, a limited set of REST API's that allow a user to view cluster-wide resources and to perform basic administrative functions including creating namespaces and adding users to a namespace, wherein the user is not an administrator.

12. The computer program product of claim 11, wherein the service deployer sets up clusters in an automated fashion based on user specified configurations.

13. The computer program product of claim 11, wherein the service deployer enforces strict security policies on the cluster to prevent administrator cluster-wide access to the cluster.

14. The computer program product of claim 11, wherein the service deployer creates user roles and exposes the user roles to the administrator.

15. The computer program product of claim 11, wherein the secure deployer maintains cluster administrator credential that are abstracted from a user.

* * * * *